(12) United States Patent
Hammerschmidt et al.

(10) Patent No.: US 8,337,801 B2
(45) Date of Patent: Dec. 25, 2012

(54) PROCESS AND PLANT FOR PRODUCING CALCINE PRODUCTS

(75) Inventors: Joerg Hammerschmidt, Bad Homburg (DE); Bernd Kerstiens, Rosbach v.d. Hoehe (DE); Peter Sturm, Karben (DE)

(73) Assignee: Outotec Oyj, Espoo (FI)

( * ) Notice: Subject to any disclaimer, the term of this patent is extended or adjusted under 35 U.S.C. 154(b) by 62 days.

(21) Appl. No.: 13/003,307

(22) PCT Filed: Jul. 10, 2009

(86) PCT No.: PCT/EP2009/005043
§ 371 (c)(1),
(2), (4) Date: Apr. 28, 2011

(87) PCT Pub. No.: WO2010/003693
PCT Pub. Date: Jan. 14, 2010

(65) Prior Publication Data
US 2011/0195016 A1    Aug. 11, 2011

(30) Foreign Application Priority Data
Jul. 11, 2008    (DE) .......................... 10 2008 033 558

(51) Int. Cl.
*B01J 8/18*    (2006.01)
*C01B 17/00*    (2006.01)
(52) U.S. Cl. ...................... 423/561.1; 422/144; 422/146
(58) Field of Classification Search ............... 423/561.1; 422/144, 146
See application file for complete search history.

(56) References Cited

U.S. PATENT DOCUMENTS

| 4,889,694 | A | * | 12/1989 | Spink et al. ................... 423/110 |
| 5,783,158 | A | | 7/1998 | Tacke |
| 6,482,373 | B1 | | 11/2002 | Hannaford |
| 6,699,302 | B1 | | 3/2004 | Jones |
| 2006/0230879 | A1 | | 10/2006 | Stroder |

FOREIGN PATENT DOCUMENTS

| DE | 19609284 A1 | 9/1997 |
| EP | 1157139 B1 | 10/2002 |
| WO | WO 2004/057041 A1 | 7/2004 |

OTHER PUBLICATIONS

Search report for International Application No. PCT/EP2009/005043, Sep. 10, 2009.
Hammerschmidt J, *Roasting of gold ore in the circulating fluidized-bed technology*, Developments in mineral processing, vol. 15, p. 433-453, 2005.
Jones, Rodney T., *ConRoast: DC arc smelting of dead roasted sulphide concentrates*, Pyrometallurgy Division, Mintek, 2008.

* cited by examiner

*Primary Examiner* — Timothy Vanoy
(74) *Attorney, Agent, or Firm* — Leydig, Voit & Mayer, Ltd.

(57) ABSTRACT

A process for producing calcine products includes dead roasting a metal sulfide concentrate having a low sulfur content. The concentrate is roasted in a circulating fluidized bed at a temperature of about 950 to 1050° C. A waste gas of the fluidized bed is passed through at least one of a recuperator and a Venturi drier so as to respectively provide at least one of a preheating of at least a portion of air fluidizing the fluidized bed and a drying of at least a portion of the concentrate to be roasted. The calcine product obtained in the fluidized bed with a sulfur content of less than 1 wt-% is provided for further processing.

19 Claims, 1 Drawing Sheet

PROCESS AND PLANT FOR PRODUCING CALCINE PRODUCTS

CROSS-REFERENCE TO PRIOR APPLICATIONS

This application is a U.S. National Phase application under 35 U.S.C. §371 of International Application No. PCT/EP2009/005043, filed Jul. 10, 2009, and claims benefit to German Patent Application No. DE 10 2008 033 558.4, filed on Jul. 11, 2008. The International Application was published in English on Jan. 14, 2010 as WO 2010/003693 A1 under PCT Article 21 (2).

FIELD

This invention relates to a process and a plant for producing calcine products by dead roasting of metal sulfide concentrate, in particular concentrate with a low sulfur content (<15 wt-%) such as PGM (platinum-group metal) sulfide concentrate.

BACKGROUND

PGM sulfide concentrates have a sulfur content of about 2 to 7 wt-%. This sulfur content is too high to allow treatment of the concentrates directly in an electric furnace or the like by separating $SO_2$, but also too low to process the concentrates in a conventional overall plant comprising roaster, gas cleaning and sulfuric acid plant, since the concentration of the $SO_2$ gas generated would be too low to be processed in an autothermally operated sulfuric acid plant.

EP 1 157 139 B1 describes a process in which the concentrate is roasted completely and subsequently smelted in an electric arc furnace under reducing conditions, so that metal or metals are accumulated in an alloy. The roasting operation is performed in a fluidized-bed reactor such that a constant flow of $SO_2$-containing gas is formed, which can be used for charging a sulfuric acid production. The $SO_2$-containing gas released can be subjected to a gas cleaning. There is not shown a way how to achieve a rather low sulfur content of the roasted concentrate.

The publication "ConRoast: DC arc smelting of dead roasted sulphide concentrates" (http://www.pyrometallurgie.co.za./MINTEK/ConRoast.ConRoast.html) describes a process for the treatment of nickel, copper and PGM sulfide concentrate, in which the sulfur is withdrawn from the roasting reactor and used in a continuous stream of $SO_2$-containing waste gas for charging a sulfuric acid plant. The dead roasted concentrate is molten in a DC electric arc furnace by using an iron-based alloy as collector for nickel, copper, cobalt and PGMs.

SUMMARY

In an embodiment, the present invention provides a process for producing calcine products which includes dead roasting a metal sulfide concentrate having a low sulfur content. The concentrate is roasted in a circulating fluidized bed at a temperature of about 950 to 1050° C. A waste gas of the fluidized bed is passed through at least one of: a recuperator so as to preheat at least a portion of fluidizing air of the fluidized bed and a Venturi drier so as to dry at least a portion of the concentrate to be roasted. The calcine product obtained in the fluidized bed with a sulfur content of less than 1 wt-% is provided for further processing.

BRIEF DESCRIPTION OF THE DRAWINGS

The figures are described in detail in the following exemplary embodiments. However, the invention is not limited to the exemplary embodiments. Other features and advantages of various embodiments of the present invention will become apparent by reading the following detailed description with reference to the attached drawings which illustrate the following.

DETAILED DESCRIPTION

Figure 1:
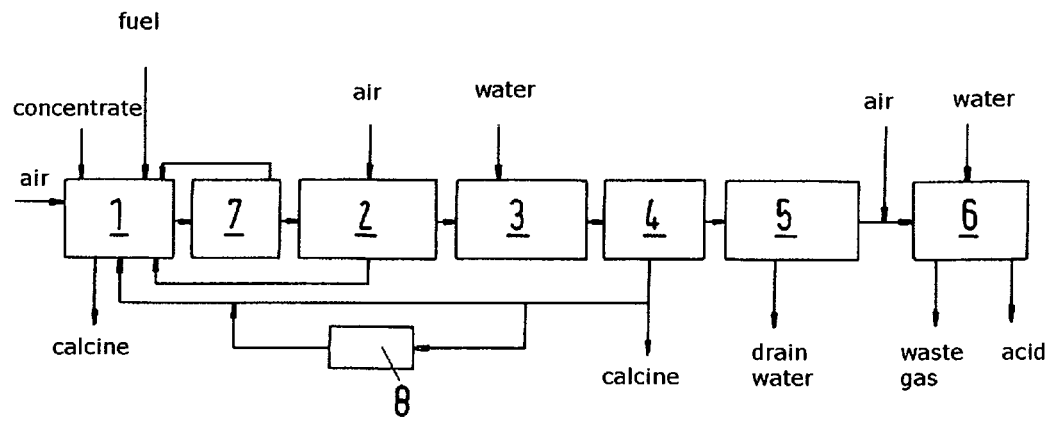
FIG. 1 shows a plant variant determined for performing the process of the invention when using a recuperator for recovering heat.

In an embodiment, the present invention provides a process to the effect that the roasted concentrate has a rather low sulfur content, at the same time the $SO_2$ concentration of the waste gas released before the acid plant is as high as possible to provide for an autothermal operation of the acid plant, and the procedure in addition calls for a rather low supply of additional energy.

In accordance with an embodiment of the present invention, the concentrate is roasted in a circulating fluidized bed at a temperature of about 950 to 1100° C., the $SO_2$-containing waste gas of the fluidized bed is passed through a recuperator for preheating at least part of the fluidizing air guided into the fluidized bed, or is passed through a Venturi drier for drying at least part of the concentrate to be roasted, and the calcine product obtained in the fluidized bed upon roasting is provided for further processing with a sulfur content <1 wt-%, in particular <0.5 wt-%. The energy contained in the calcine is transferred into the electric furnace with the calcine. The $SO_2$-containing waste gas released preferably is provided to a sulfuric acid plant.

In accordance with an embodiment of the present invention, roasting is effected in the fluidized bed at a temperature >1000° C., since here a strong decrease of the sulfur concentration in the calcine product could be detected.

Using a circulating fluidized bed, which in particular is fluidized with air, provides for utilizing a relatively small fluidized-bed reactor with a high throughput. Heat recovery from the waste gas in a downstream recuperator for fluidization in the fluidized bed reduces the consumption of energy, because fuel, e.g. coal (coke) or gas, can be saved in the fluidized bed. At the same time, the waste gas stream and the content of $N_2$ and $CO_2$ in the waste gas is reduced, so that the $SO_2$ concentration measured before the air inlet, which in turn is located before the sulfuric acid plant, rises to 3 to 6 vol-%.

When recovering heat from the waste gas in a Venturi drier downstream of the fluidized bed, fuel also is saved in the fluidized bed and the waste gas stream is reduced, so that the $SO_2$ concentration in the waste gas stream measured before the air inlet, which in turn is located before the sulfuric acid plant, likewise will rise and hence an autothermal operation of the sulfuric acid plant becomes possible. Therefore, the sulfuric acid plant does not require an additional supply of energy.

In case the fluidizing air from the recuperator is not sufficient for fluidization, additional air apart from the air preheated in the recuperator can be supplied to the fluidized bed for instance via a second air blower. When using both the recuperator and the Venturi drier, the fluidizing air can be enriched by technical oxygen. When using the recuperator, the second fluidizing air, which has not been preheated in the recuperator, can be replaced by technical oxygen or be enriched in any case. The use of technical oxygen will decrease the waste gas volume flow and increase the $SO_2$ concentration before the acid plant, so that the same still can be operated autothermally with low sulfur concentrations of the concentrate to be roasted. This can serve to increase the flexibility of the process.

It is also possible to use a waste gas recirculation after a corresponding cleaning, whereby the $SO_2$ content in the waste gas stream also can be increased.

Since not all solids can be separated in a cyclone downstream of the fluidized bed and it must be assumed that part of these solids will again react with the $SO_2$-containing waste gas, it is also possible to recirculate separated solids into the fluidized-bed reactor. In this way, the required low sulfur concentration can still be maintained in the total mixture of the calcine product discharged.

Since most of these solids are fine particles, this material also can undergo a partial or complete treatment in a microgranulation beside an untreated recirculation. The solids are microgranulated, so that the mean grain size d50 of the material is increased to e.g. 0.05 to 1.5 mm, preferably 0.3 to 0.7 mm.

To avoid a resulfatization after the fluidized-bed furnace, the oxygen concentration in the waste gas after the fluidized-bed furnace should be as low as possible, but still provide for a complete combustion of the fuels in the fluidized-bed furnace. In accordance with the invention, the oxygen concentration in the waste gas at the outlet of the recirculation cyclone of the fluidized bed therefore is 1 to 4 vol-%, preferably 2 to 3 vol-%. If the fuel has not been burnt completely and hence CO gas is present in the waste gas, the waste gas or the CO gas will be burnt completely to obtain $CO_2$ gas in a postcombustion in accordance with the invention.

Upon release of heat, the waste gas particularly preferably is rapidly cooled in the recuperator or the Venturi drier to a temperature below about 350° C. within less than 10 sec, preferably less than 5 sec, and in particular less than 2 sec. In this way, a resulfatization of the dust content in the waste gas stream is avoided or substantially reduced. A slow cooling in a unit such as in a waste heat boiler with a relatively long retention time would be unsuitable to obtain low sulfur contents in the roasted concentrate. Therefore, evaporation coolers preferably are used for rapid cooling, with which even a cooling time of below 1 to 2 sec can be achieved.

When using a Venturi drier, resulfatization of the solids entrained with the waste gas stream can largely be avoided due to the short time of contact of the waste gas stream with fresh concentrate. Should the temperature at the outlet of the Venturi drier to the downstream cyclone fall below about 800° C., a partial stream of the concentrate can directly be introduced into the fluidized bed, so that the temperature in the Venturi drier will rise again and a sulfatization in the downstream units such as the cyclone is avoided. In all cases, the $SO_2$ content in the waste gas stream increases with decreasing resulfatization. Under these circumstances, the admissible minimum sulfur concentration in the concentrate decreases, with an autothermal operation of the acid plant still being possible.

When the calcine product obtained in the fluidized bed upon roasting is molten in an electric arc furnace, it is advantageous to supply the calcine product of the fluidized bed to the electric arc furnace for utilization of heat.

A plant which is suitable for performing the process of the invention as described above—with the same objective as mentioned above—substantially consists of a fluidized-bed reactor and a recuperator or Venturi drier downstream of the fluidized-bed reactor in the waste gas stream for transferring and recirculating the heat of the waste gas to the fluidizing air introduced into the fluidized-bed reactor and/or to the concentrate to be roasted thereafter.

In the waste gas stream, a cooler which preferably constitutes an evaporation cooler can be provided downstream of the recuperator or the Venturi drier, in order to achieve a rapid cooling of the waste gas stream to below about 350° C.

In the waste gas stream, the plant furthermore can include a preferably electrostatically operating solids separator and a microgranulation for the treatment of the solids to be recirculated.

The plant as shown in FIG. 1 includes a fluidized-bed reactor 1 (circulating fluidized bed) for dead roasting metal sulfide concentrates, in particular PGM (platinum-group metal) sulfide concentrates for producing so-called calcine products. The concentrate to be treated is roasted in the reactor with the circulating fluidized bed 1 at a temperature of about 950 to 1050° C. Roasting is effected by using coal (coke) or gas and fluidizing air, possibly by adding oxygen. The plant can be operated such that the roasted concentrate for instance has a sulfur content of <1 wt-%, in particular <0.5 wt-%, and particularly preferably <0.3 wt-%. The sulfur content is adjusted via the temperature and the oxygen content of the waste gas stream. The plant can effectively and flexibly be adapted in consideration of the water and sulfur content of the starting materials. The oxygen concentration in the waste gas—measured after the first recirculation cyclone of the fluidized bed—is 1 to 4 vol-%, preferably 2 to 3 vol-%, in accordance with the invention. Upon treatment of the concentrate at about 1000° C. in the fluidized-bed reactor 1, the major part of the calcine product obtained is supplied for instance (directly) to an electric arc furnace for melting.

The $SO_2$-containing waste gas stream of the fluidized bed 1 is guided over a centrifugal separator (cyclone) 7 for separating solid particles from the waste gas stream, and over a recuperator 2, in order to preheat at least part of the fluidizing air by heat recovery. Upon leaving the recuperator 2, the waste gas has a temperature of 700 to 900° C., in particular about 850° C. As an alternative to the use of the recuperator, the hot waste gas can be passed through a Venturi drier and thereby dry moist concentrate, which subsequently is separated from the waste gas stream in a second cyclone. Both the heated fluidizing air and the heated and completely or partly dried concentrate subsequently are introduced into the fluidized bed 1.

To avoid a resulfatization, the waste gas stream is rapidly cooled within fractions of a second or few seconds to a temperature of not more than about 350° C. by means of a cooler 3 which constitutes an evaporation cooler, so that the waste gas stream enters the gas cleaning with an acceptable temperature which is not too high.

In a solids separator 4 provided in the waste gas stream downstream of the cooler 3, which for instance operates electrostatically, the major part of the remaining waste gas dust is precipitated and at least partly recirculated to the fluidized-bed reactor 1. It is also possible to at least partly compact the solids in a microgranulation 8 to obtain particles with a mean grain size d50 of preferably 0.3 to 0.7 mm, before it is recirculated to the fluidized-bed reactor 1.

Before the $SO_2$-containing waste gas stream with an $SO_2$ content of 3 to 5 vol-% (measured before the air inlet which is located before the sulfuric acid plant) is transferred into the sulfuric acid plant 6, the waste gas stream is subjected to a wet gas cleaning 5.

Using the recuperator 2 in such plant has the following advantages: direct energy recovery in the recuperator 2, reduction of the fuel consumption in the fluidized-bed reactor 1, further reduction of the waste gas volume flow and hence reduction of the plant size, increase of the $SO_2$ concentration in the waste gas stream at the inlet of the sulfuric acid plant 6 and hence provision for the treatment of concentrates with a low sulfur concentration with a still autothermal operation of the sulfuric acid plant 6.

When the fluidizing air preheated by heat recovery is replaced by technical oxygen or by air enriched with oxygen, the fuel consumption in the fluidized bed 1 is reduced, the $SO_2$ concentration in the waste gas rises, the waste gas volume flow is reduced, and a higher flexibility is achieved for the treatment of concentrates with a low sulfur concentration. Thus, it is also possible to process concentrate with a lower sulfur content.

By recirculating the waste gas dust from the electrostatically operating solids separator into the fluidized bed, the sulfur concentration in the calcine product can further be reduced. When the sulfur content of the calcine from the electrostatic solids separator 4 or the mixture of the calcine from the fluidized bed 1 with at least a partial stream from the electrostatic solids separator 4 satisfies the requirements, at least a partial stream of the calcine can be withdrawn after the solids separator 4 and be supplied to the electric furnace.

For saving energy, the calcine product also can directly be fed into an electric arc furnace for melting.

Figure 2:
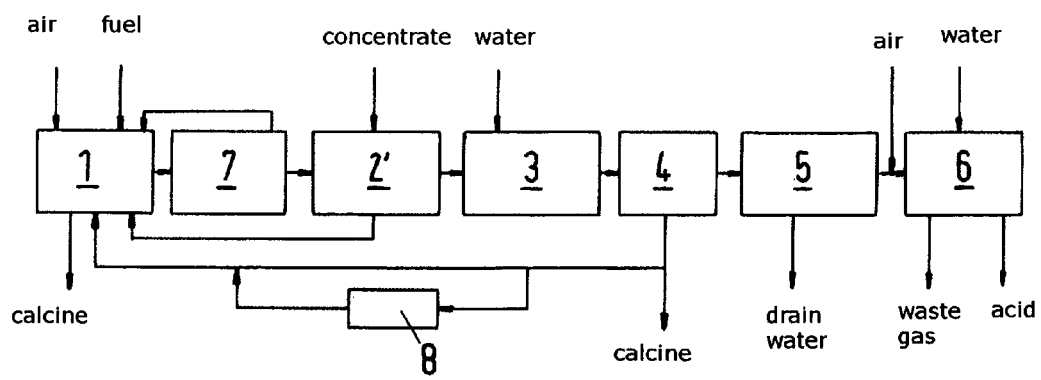
FIG. 2 shows an alternative to the plant version as shown in FIG. 1, wherein a Venturi drier is used in the waste gas stream instead of a recuperator.

In the plant variant as shown in FIG. 2 for the treatment of metal sulfide concentrates in the fluidized-bed reactor 1, a Venturi drier 2' is provided instead of the recuperator 2 for heat recovery, which also includes a further centrifugal separator (2nd cyclone). In this case, the starting material should be introduced into the Venturi drier 2' with a moisture content of 10 to 20%, preferably approximately 16%, without first passing through a preliminary drying. In the Venturi drier 2', the moist concentrate is dried by the hot waste gas of the circulating fluidized bed and discharged with the same into the succeeding centrifugal separator. The counterflow of the entering waste gas from the fluidized-bed reactor 1 dries the material supplied. In this case, predrying the concentrate to a residual moisture of about 1 to 5% can be omitted outside the overall plant (fluidized bed gas cleaning sulfuric acid plant).

All parts of the plant arranged after the Venturi drier 2' correspond to the concept of the plant as shown in FIG. 1. Downstream of the centrifugal separator 2' there is also provided an evaporation cooler which cools the waste gas to below about 350° C. Therefore, the following (also) is achieved: recovery of energy from the waste gas stream, saving of an additional concentrate drier before the fluidized bed, saving of fuel for drying the concentrate in a separate drier or in the fluidized-bed reactor itself, reduction of the waste gas volume flow, increase of the $SO_2$ concentration in the waste gas stream and reduction of the technically possible minimum sulfur concentration for the treated concentrate, in order to provide for an autothermal operation of the sulfuric acid plant.

While the invention has been particularly shown and described with reference to preferred embodiments thereof, it will be understood by those skilled in the art that various changes in form and details may be made therein without departing from the spirit and scope of the invention.

LIST OF REFERENCE NUMERALS

1 fluidized bed (reactor)
2 recuperator
2' Venturi drier and centrifugal separator (cyclone)
3 cooler, evaporation cooler
4 (electrostatic) solids separator
5 wet gas cleaning
6 sulfuric acid plant
7 centrifugal separator (cyclone)
8 microgranulation

The invention claimed is:

1. A process for producing calcine products comprising:
   dead roasting a metal sulfide concentrate having a low sulfur content, the concentrate being roasted in a circulating fluidized bed at a temperature of about 950 to 1050° C.;
   passing a waste gas of the fluidized bed through at least one of: a recuperator so as to preheat at least a portion of fluidizing air of the fluidized bed and a Venturi drier so as to dry at least a portion of the concentrate to be roasted; and
   providing for further processing calcine product obtained in the fluidized bed with a sulfur content of less than 1 wt-%.

2. The process according to claim 1, wherein the concentrate is a platinum-group metal sulfide concentrate.

3. The process according to claim 1, wherein the roasting is performed in the fluidized bed at a temperature greater than 1000° C.

4. The process according to claim 1, wherein at least one of additional air and oxygen are supplied to the fluidized bed.

5. The process according to claim 1, wherein at least a portion of the waste gas is cleaned and recirculated to the fluidized bed.

6. The process according to claim 1, wherein solids contained in the waste gas are separated and at least partially recirculated to the fluidized bed.

7. The process according to claim 6, wherein the solids that are recirculated to the fluidized bed are at least partially treated in a microgranulation so as to obtain a desired mean grain size of the solids.

8. The process according to claim 1, wherein an oxygen concentration in the waste gas of the fluidized bed reactor is adjusted to about 1 to 4 vol-%.

9. The process according to claim 8, wherein the oxygen concentration in the waste gas of the fluidized bed reactor is adjusted to about 2 to 3 vol-%.

10. The process according to claim 1, wherein the waste gas, upon release of heat, is cooled in the at least one of the recuperator and the Venturi drier in less than 1 min to a temperature below about 350° C.

11. The process according to claim 10, wherein the waste gas is cooled in less than 10 sec.

12. The process according to claim 1, wherein the calcine product obtained in the fluidized bed, upon roasting, is molten in an electric arc furnace prior to a hydrometallurgical treatment.

13. The process according to claim 12, wherein the calcine product obtained in the fluidized bed is supplied directly to the electric arc furnace.

14. The process according to claim 1, wherein $SO_2$-containing waste gas is provided to a sulfuric acid plant.

15. A plant for producing calcine products comprising:
   a fluidized-bed reactor configured to dead roast a metal sulfide concentrate having a low sulfur content;
   at least one of a recuperator and a Venturi drier disposed downstream of the fluidized-bed reactor in a waste gas stream of the fluidized-bed reactor and configured to recover heat of the waste gas to fluidizing air of the fluidized bed reactor, the fluidizing air being subsequently provided to at least one of the fluidized-bed reactor and the concentrate to be roasted; and
   a microgranulation configured to treat solids recirculated to the fluidized-bed reactor.

16. The plant according to claim 15, further comprising a cooler disposed downstream of the at least one of the recuperator and the Venturi drier in the waste gas stream.

17. The plant according to claim 16, wherein the cooler includes an evaporation cooler.

18. The plant according to claim 15, further comprising a solids separator disposed in the waste gas stream.

19. The plant according to claim 18, wherein the solids separator is configured to operate electrostatically.

* * * * *